US012564905B2

(12) United States Patent
Zhu et al.

(10) Patent No.: US 12,564,905 B2
(45) Date of Patent: Mar. 3, 2026

(54) IN-LASER WIRE FEEDING DEVICE HAVING INDUCTIVE AUXILIARY HEATING FUNCTION

(71) Applicant: SOOCHOW UNIVERSITY, Suzhou (CN)

(72) Inventors: Gangxian Zhu, Suzhou (CN); Liang Zhao, Suzhou (CN); Lifang Wang, Suzhou (CN); Guangqi Li, Suzhou (CN); Shihong Shi, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 837 days.

(21) Appl. No.: 17/908,261

(22) PCT Filed: Feb. 3, 2021

(86) PCT No.: PCT/CN2021/074964
§ 371 (c)(1),
(2) Date: Aug. 31, 2022

(87) PCT Pub. No.: WO2021/179857
PCT Pub. Date: Sep. 16, 2021

(65) Prior Publication Data
US 2023/0264299 A1 Aug. 24, 2023

(30) Foreign Application Priority Data
Mar. 8, 2020 (CN) .......................... 202010154611.7

(51) Int. Cl.
*B23K 26/70* (2014.01)
*B23K 26/342* (2014.01)
(Continued)

(52) U.S. Cl.
CPC .......... *B23K 26/702* (2015.10); *B23K 26/342* (2015.10); *B33Y 10/00* (2014.12); *B33Y 40/00* (2014.12)

(58) Field of Classification Search
CPC .... B23K 26/342; B23K 26/702; B23K 26/34; B33Y 10/00; B33Y 40/00
See application file for complete search history.

(56) References Cited

U.S. PATENT DOCUMENTS

2010/0059493 A1 3/2010 Mcaninch

FOREIGN PATENT DOCUMENTS

CN 201915148 U 8/2011
CN 108857031 A 11/2018
(Continued)

OTHER PUBLICATIONS

Machine translation of Zhou (CN 108544092), performed on Aug. 12, 2025 (Year: 2018).*

(Continued)

*Primary Examiner* — Brian W Jennison
(74) *Attorney, Agent, or Firm* — SZDC Law PC

(57) ABSTRACT

An in-laser wire feeding device having an inductive auxiliary heating function, comprising a wire feeding pipeline and a laser path unit. The wire feeding pipeline comprises upper and lower wire feeding pipes, and a gap zone is formed between the upper and lower wire feeding pipes. The in-laser wire feeding device further comprises a connecting piece which is located on one side of the gap zone and links the upper wire feeding pipe with the lower wire feeding pipe, an inductive heating coil, and a power supply component. The inductive heating coil comprises a coil body and a connecting part. The center line of the coil body, the center line of the upper wire feeding pipe and the center line of the lower wire feeding pipe are collinear, and the inner wall of (Continued)

the coil body can avoid laser beams reflected downwards by
a reflecting mirror.

9 Claims, 8 Drawing Sheets

(51) Int. Cl.
    *B33Y 10/00*       (2015.01)
    *B33Y 40/00*       (2020.01)

(56)             References Cited

FOREIGN PATENT DOCUMENTS

| CN | 110640322 | A | 1/2020 |
|----|-----------|---|--------|
| CN | 111185671 | A | 5/2020 |
| CN | 210755853 | U | 6/2020 |
| CN | 212217452 | U | 12/2020 |
| JP | 2010227947 | A | 10/2010 |

OTHER PUBLICATIONS

Machine translation of Sugakawa (JP20100227947), Performed on
Aug. 12, 2025 (Year: 2010).*

* cited by examiner

IN-LASER WIRE FEEDING DEVICE HAVING INDUCTIVE AUXILIARY HEATING FUNCTION

This disclosure is a national phase application of PCT international patent application PCT/CN2021/074964, filed on Feb. 3, 2021, which claims the priority to Chinese patent application No. 202010154611.7 titled "IN-LASER WIRE FEEDING DEVICE HAVING INDUCTIVE AUXILIARY HEATING FUNCTION", filed with the China National Intellectual Property Administration on Mar. 8, 2020, which is incorporated herein by reference in its entirety.

FIELD

The present disclosure relates to the technical field of laser additive manufacturing equipment, in particular to an inside-laser wire feeding device having an inductive auxiliary heating function.

BACKGROUND

Laser additive manufacturing technology uses a high-power laser as an energy source to melt metal powder or wire, from point to line to surface, and then accumulate layer by layer to produce three-dimensional solid parts. Since fully dense metal parts with excellent mechanical properties can be directly manufactured by this technology, it has broad disclosure prospects in the fields of aerospace, automobiles, ships and military equipment. For the synchronous laser additive manufacturing technology based on wire feeding, because the metal wire is conveyed rigidly without divergence, the material utilization rate is almost 100%, the energy is saved and the environment is protected, and the cladding surface roughness is low, which can avoid the problems of powder dispersion and low powder utilization rate caused by powder feeding. In addition, the cost of wire material is relatively low and the wire material is easy to obtain, and it has the advantages to achieve precise control easily and fast feeding speed, and the wire feeding cladding is considered to have great development space.

However, as far as the current development is concerned, the synchronous laser additive manufacturing technology based on the wire feeding has not been substantially industrially applied. The reason is mainly due to the imperfect wire feeding laser additive manufacturing equipment and the relatively poor coupling accuracy between the beam and the wire, resulting in poor forming accuracy. Therefore, the applicant has submitted a Chinese patent in CN110640322A, and discloses an inside-laser wire feeding device for wire feeding in laser additive manufacturing, which includes a wire feeding pipeline and a laser path unit. The laser path unit includes a laser connector, a collimation module, a laser splitting module, and a laser path turning module with a reflector mirror, where the laser splitting module includes a beam splitter, and a reflector in a one-to-one correspondence with a mirror of the beam splitter and configured to reflect a beam to the reflector mirror, the reflector mirror is arranged obliquely and is located on a bottom surface of the laser path turning module. The wire feeding pipeline passes through an interior of the laser path turning module from top to bottom, where a wire outlet of the wire feeding pipeline is located below the reflector mirror. The beam emitted from the laser forms a parallel beam under the collimation module, and the parallel beam is divided into at least two laser paths under the beam splitter. Each laser path is reflected to the corresponding reflector, the reflector reflects the laser paths to the reflector mirror, and then the reflector mirror reflects two or more laser paths downward to form a convergent focus. The convergent focus is located below the wire outlet of the wire feeding pipe, and the center of the convergent focus is collinear with the center of the wire feeding pipe. Therefore, the disclosure of this document solves the problem of ensuring that the beam and the wire are coaxial when entering the molten pool, avoids the angle change during the wire feeding process, and improves the forming accuracy.

However, in the cladding process of the above-mentioned inside-laser wire feeding device, the molten droplets at the end of the wire are subject to a process of gradually growing and then detaching, which is easy to cause discontinuity of the molten channel, and the solidified surface of the cladding layer is uneven in the shape of fish scales. This affects the quality of the cladding layer. Therefore, in order to solve this problem, it is necessary to consider preheating the wire before it enters into the molten pool. The study found that when the wire is preheated, the wire cladding efficiency and the quality of the cladding layer are greatly improved.

For example, for lateral "outside-laser" wire feeding, resistance heating is generally used to preheat the wire. The so-called "outside-laser" powder feeding is to send the wire through the outside of the laser beam into the molten pool generated by the laser. This method has problems such as scanning direction limitation and the inability to ensure accurate coupling of laser and wire, and during preheating, the wire and the substrate form a circuit to pass current, so the preheating efficiency is low and the cost is high.

SUMMARY

The technical problems to be solved by the present disclosure is to overcome the deficiencies of the prior art and provide an improved inside-laser wire feeding device having an inductive auxiliary heating function.

In order to solve the above technical problems, the following technical solutions are provided according to the present disclosure.

An inside-laser wire feeding device having an inductive auxiliary heating function is provided, which includes:

a laser path unit, where the laser path unit includes a laser connector, a collimation module, a laser splitting module, and a laser path turning module with a reflector mirror, where the laser splitting module includes a beam splitter, and a reflector in a one-to-one correspondence with a mirror of the beam splitter and configured to reflect a beam to the reflector mirror, the reflector mirror is arranged obliquely and is located on a bottom surface of the laser path turning module;

a wire feeding pipeline, passing through an interior of the laser path turning module from top to bottom, where a wire outlet of the wire feeding pipeline is located below the reflector mirror, where the wire feeding pipeline includes an upper wire feeding pipe and a lower wire feeding pipe which are discontinuous, and the centerlines of which are overlapped, where a gap zone is formed between the upper wire feeding pipe and the lower wire feeding pipe, the inside-laser wire feeding device further includes a connecting piece located on one side of the gap zone and connecting the upper wire feeding pipe and the lower wire feeding pipe, an inductive heating coil arranged on the connecting piece and located in the gap zone, and a power supply component in communication with the inductive heating coil, where the inductive heating coil includes a coil body spirally wound along a length direction of the upper wire feeding pipe or the lower wire feeding pipe, and a connecting portion that communicates with positive and negative electrodes of the power supply component at a head end and a tail end of the coil body, respectively, and a centerline of the coil body, a centerline of the upper wire feeding pipe, and a centerline of the lower wire feeding pipe are arranged collinearly, and an inner wall of the coil body is able to avoid the beam reflected downward from the reflector mirror.

Preferably, the connecting piece includes a connecting panel extending along a height direction of the gap zone, an upper connecting plate connected to the upper wire feeding pipe from an upper part of the connecting panel, and a lower connecting plate connected to the lower wire feeding pipe from a lower part of the connecting panel, and the inductive heating coil is connected to the connecting panel from the connecting portion of the inductive heating coil.

Further, threaded holes are formed on the upper connecting plate and the lower connecting plate, respectively, the upper connecting plate is detachably connected to the lower end of the upper wire feeding pipe through the threaded hole, and the lower connecting plate is detachably connected to the upper end of the lower wire feeding pipe through the threaded hole.

Preferably, the upper connecting plate and the lower connecting plate have the same structure, and are connected to the same side of the connecting panel facing the gap zone from an end away from the threaded hole.

According to an embodiment and preferred aspect of the present disclosure, an inner diameter of a lower port of the upper wire feeding pipe is equal to an inner diameter of an upper port of the lower wire feeding pipe.

Preferably, an inner diameter of the coil body is greater than or equal to the inner diameter of the upper port. The interference of the coil body to the beam is avoided.

According to an embodiment and preferred aspect of the present disclosure, the wire feeding pipeline further includes a sleeve pipe arranged on an outer periphery of the lower wire feeding pipe, where a shielding gas channel is formed between an inner wall of the sleeve pipe and an outer wall of the lower wire feeding pipe, a channel outlet of the shielding gas channel corresponds to the wire outlet of the lower wire feeding pipe, and a channel inlet of the shielding gas channel is located on one side of the sleeve pipe and provided close to the upper end of the lower wire feeding pipe.

Preferably, the lower end of the lower wire feeding pipe forms a wire outlet port with a diameter gradually decreasing from top to bottom, where an inner wall of the wire outlet port is able to avoid the beam reflected downward from the reflector mirror.

Further, an air outlet port, which is similar to the wire outlet port and forms an annular cavity is provided at a bottom of the sleeve pipe, and a bottom surface of the air outlet port is flush with a bottom surface of the wire outlet port.

In an embodiment, an annular connecting lug is formed on the lower wire feeding pipe, and the sleeve pipe is threadedly connected with the annular connecting lug at an upper end of the sleeve pipe.

Due to the implementation of the above technical solutions, the present disclosure has the following advantages compared with the prior art.

In the present disclosure, on the premise of ensuring that the beam and the wire entering the molten pool are coaxial and do not interfere with each other, the beam and the wire pass through the interior of the inductive heating coil, and the passing wire is preheated by the inductive heating coil, thereby greatly improving the wire cladding efficiency and the cladding quality. In addition, the cost is low and the implementation is convenient.

BRIEF DESCRIPTION OF THE DRAWINGS

The present disclosure will be described in further detail below in conjunction with the accompanying drawings and specific embodiments.

Figure 1:
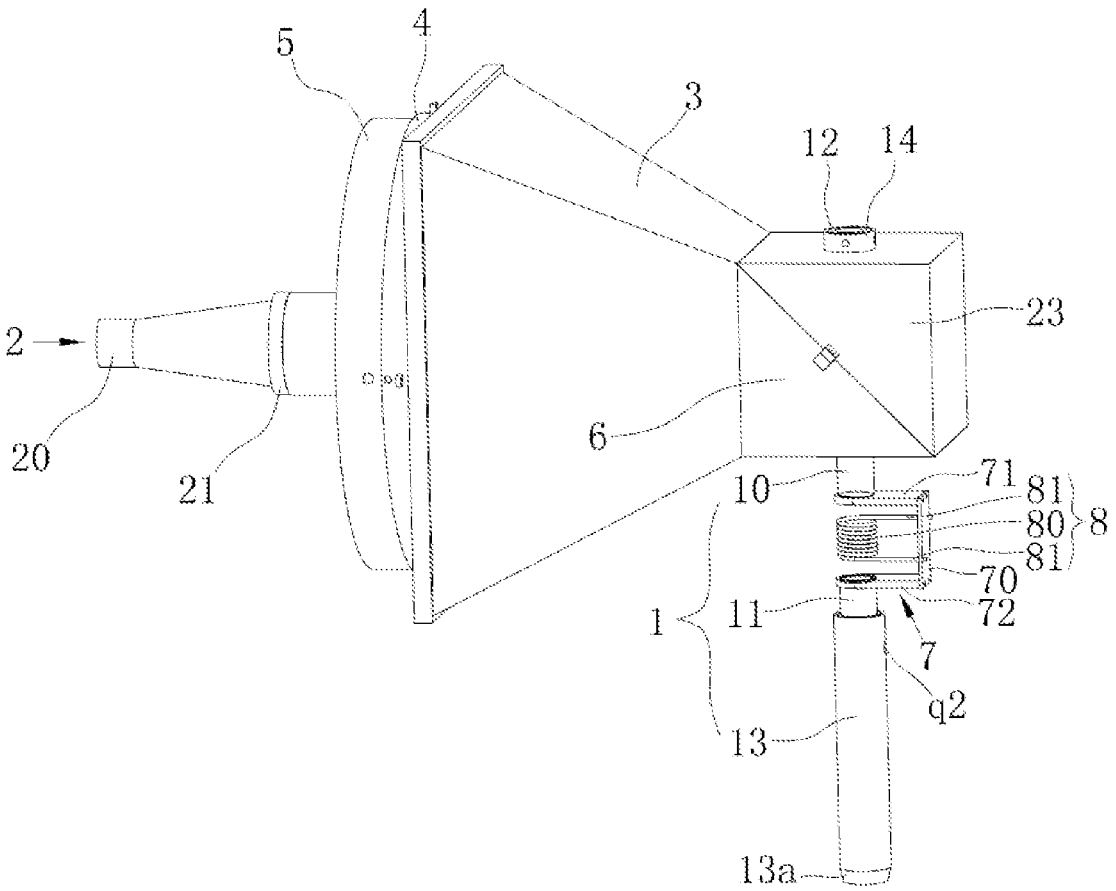
FIG. 1 is a three-dimensional structure schematic diagram of an inside-laser wire feeding device according to the present disclosure.

| Reference numerals: | |
| --- | --- |
| 1. wire feeding pipeline, | 1a. wire outlet, |
| 10. upper wire feeding pipe, | 11. lower wire feeding pipe, |
| 11a. wire outlet port, | 11b. annular connecting lug, |
| 12. pipe cap, | 13. sleeve pipe, |
| 13a. air outlet port, | 14. pipe sleeve, |
| 2. laser path unit, | 20. laser connector, |
| 21. collimation module, | 22. laser splitting module, |
| 220. beam splitter, b. mirror, | 221. Reflector, |
| 23. laser path turning module; | |
| 3. photomask, | |
| 4. annular seat, | 40. annular body, |
| 41. annular positioning strip, c. support rod, | |
| 5. annular cover, | 50. beam passage hole, |
| 6. connecting sleeve, | 60. missing corner, |
| 7. connecting piece, | 70. connecting panel, |
| 71. upper connecting plate, | 72. lower connecting plate, |
| 8. inductive heating coil, | 80. coil body, |
| 81. connecting portion, | |
| q. shielding gas channel, | q1. channel outlet, |
| q2. channel inlet. | |

DETAILED DESCRIPTION

In order to make the above objects, features and advantages of the present application more clearly understood, the specific embodiments of the present application will be described in detail below in conjunction with the accompanying drawings. In the following description, numerous specific details are set forth in order to provide a thorough understanding of the present application. However, the present application can be implemented in many other ways different from those described herein, and those skilled in the art can make similar improvements without departing from the connotation of the present application. Therefore, the present application is not limited by the specific embodiments disclosed below.

In the description of the present application, it is to be understood that the orientation or positional relationship indicated by the terms "center", "longitudinal", "lateral", "length", "width", "thickness", "above", "below", "front", "back", "left", "right", "vertical", "horizontal", "top", "bottom", "inner", "outer", "clockwise", "counterclockwise", "axial", "radial", "circumferential" and other indications is based on the orientation or positional relationship shown in the accompanying drawings, and it is only for the convenience of describing the present application and simplifying the description, rather than indicating or implying that the referred device or element must have a particular orientation, be constructed and operated in a particular orientation, and therefore should not be construed as a limitation of the present application.

In addition, the terms "first" and "second" are only used for descriptive purposes, and should not be construed as indicating or implying relative importance or implying the number of indicated technical features. Thus, a feature delimited with "first", "second" may expressly or implicitly include at least one of that feature. In the description of the present application, "plurality" means at least two, such as two, three, etc., unless expressly and specifically defined otherwise.

In the present application, unless otherwise expressly specified and limited, the terms "installed", "linked", "connected", "fixed" and other terms should be understood in a broad sense, for example, it may be a fixed connection or a detachable connection, or integrated; it may be a mechanical connection or an electrical connection; it may be directly connected or indirectly connected through an intermediate medium, it may be the internal connection of two elements or the interaction relationship between the two elements, unless otherwise specified limit. For those of ordinary skill in the art, the specific meanings of the above terms in the present application may be understood according to specific situations.

In the present application, unless otherwise expressly specified and limited, a first feature "on" or "under" a second feature may be in direct contact with the first and second features, or the first and second features indirectly connected through an intermediary. Further, the first feature "above", "over" and "on the top of" the second feature may mean that the first feature is directly above or obliquely above the second feature, or simply means that the first feature is level higher than the second feature. The first feature being "below", "under" and "on the bottom of" the second feature may mean that the first feature is directly below or obliquely below the second feature, or simply means that the first feature has a lower level than the second feature.

It should be noted that when an element is referred to as being "fixed to" or "disposed on" another element, it may be directly on the other element or an intervening element may also be present. When an element is referred to as being "connected" to another element, it may be directly connected to the other element or intervening elements may also be present. The terms "vertical", "horizontal", "upper", "lower", "left", "right" and similar expressions used herein are for the purpose of illustration only and do not represent the only embodiment.

Figure 2:
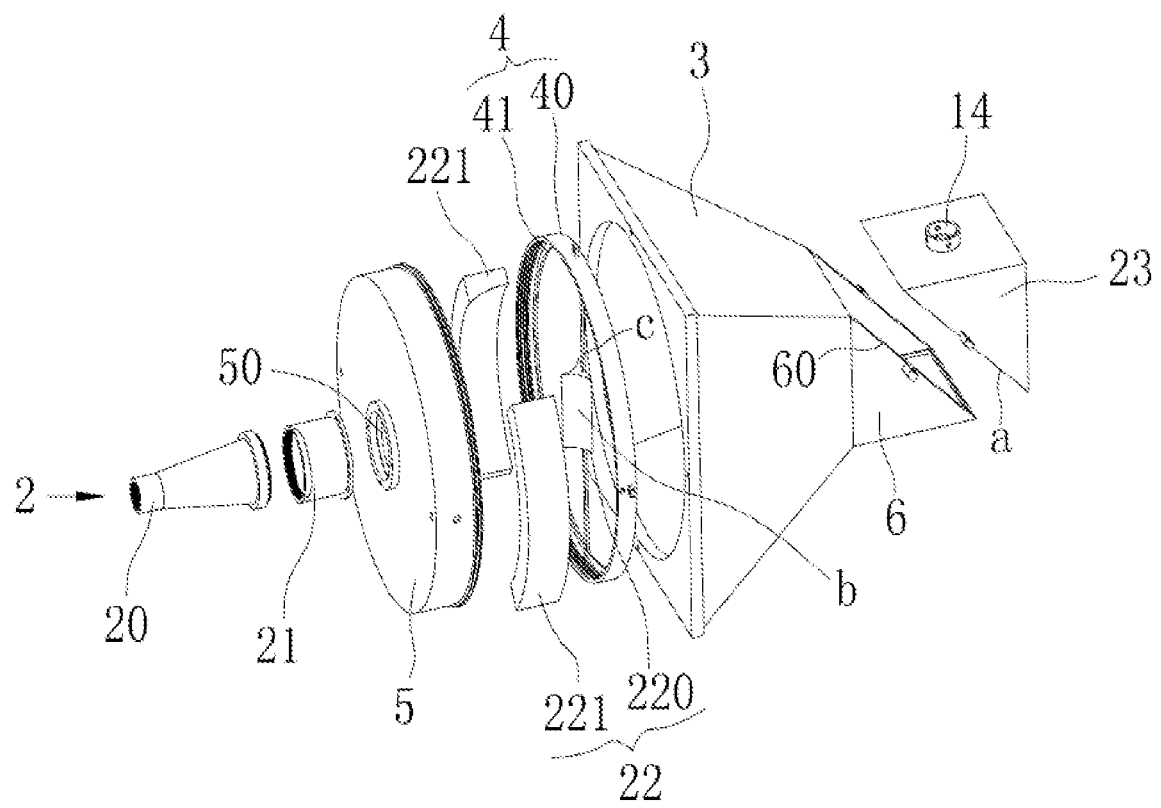
FIG. 2 is the structure exploded schematic diagram of FIG. 1.
Figure 3:
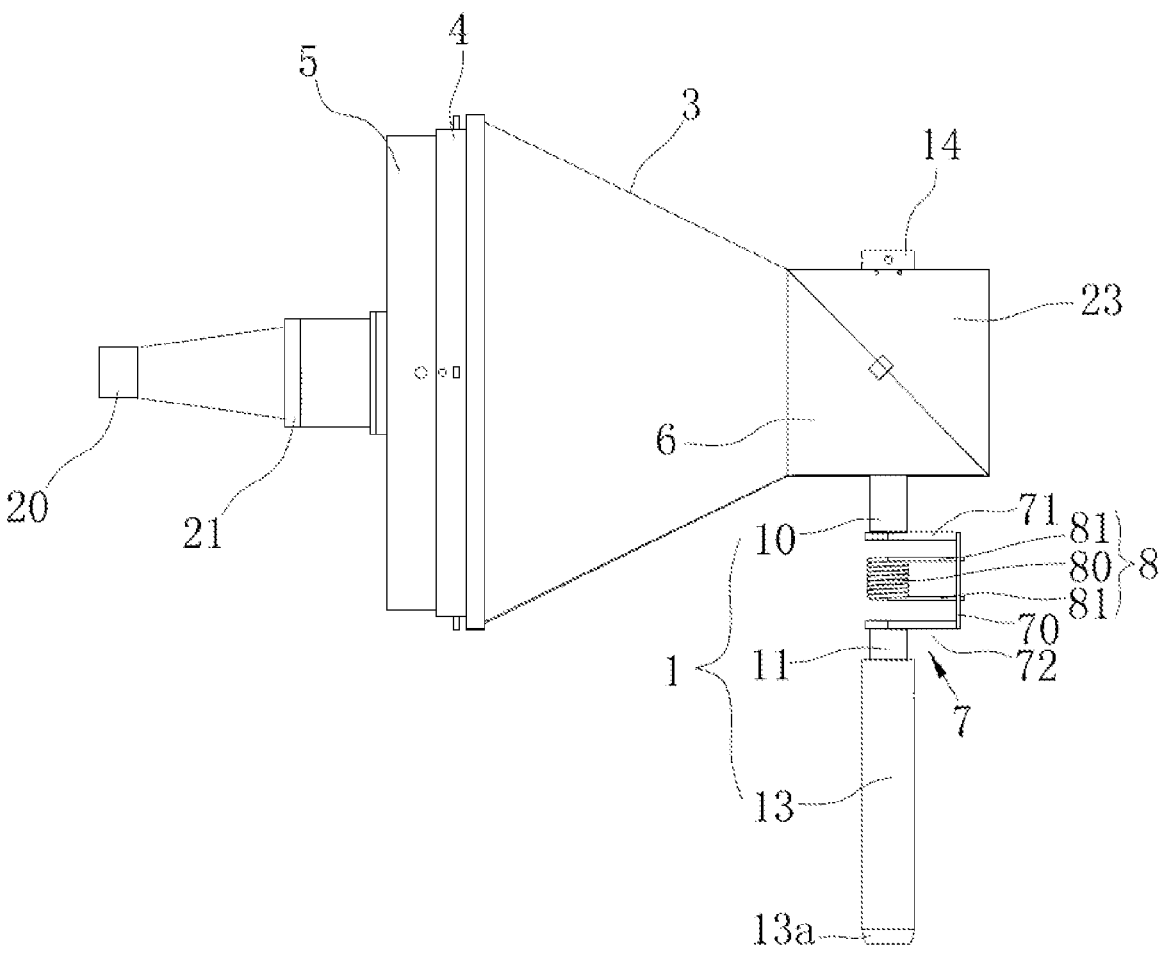
FIG. 3 is a schematic front view of FIG. 1.

As shown in FIGS. 1 to 3, an inside-laser wire feeding device for wire feeding in laser additive manufacturing includes a wire feeding pipeline 1 and a laser path unit 2.

The laser path unit 2 includes a laser connector 20, a collimation module 21, a laser splitting module 22, and a laser path turning module 23 having a reflector mirror a capable of reflecting the laser path downward, where the laser splitting module 22 includes a beam splitter 220, and a reflector 221 in a one-to-one correspondence with a mirror b of the beam splitter 220 and configured to reflect a beam to the reflector mirror a.

Specifically, the reflector mirror a is arranged obliquely and is located on a bottom surface of the laser path turning module 23, the wire feeding pipeline 1 passes through an interior of the laser path turning module 23 from top to bottom, and a wire outlet 1a of the wire feeding pipeline 1 is located below the reflector mirror a.

A beam channel is formed inside the laser connector 20, and the collimation module 21 is connected to the laser connector 20 and configured to collimate the beam to form a parallel beam.

The inside-laser wire feeding device further includes a photomask 3, an annular seat 4 connected to one end of the photomask 3, and an annular cover 5 detachably connected to the annular seat 4, where a beam passage hole 50 is provided on the annular cover 5, and the collimation module 21 is butted with the annular cover 5, and the parallel beam is incident into the annular cover 5 from the beam passage hole 50.

The beam splitter 220 is disposed in the annular cavity formed by the annular seat 4 through the support rod c, and the reflector 221 is disposed on the inner wall of the annular cover 5 and in a one-to-one correspondence with the mirrors of the beam splitter 221.

The annular seat 4 includes an annular body 40 screwed with the annular cover 5, an annular positioning stripe 41 arranged inside the annular body 40, and the support rod c extends along the radial direction of the annular positioning stripe 41 and is fixed on the annular positioning stripe 41. The base of the beam splitter 220 is disposed on one side of the support rod c, and the mirror of the beam splitter 220 faces the inner wall of the annular body 40.

The beam splitter 220 extends along the length direction of the support rod c, and has two mirrors b located on opposite sides of the support rod c. There are two corresponding reflectors 221, which are axially symmetrically arranged on opposite sides of the inner wall of the annular cover 5.

The length of the beam splitter 220 is greater than the aperture of the beam passage hole 50, which ensures that it does not exist unsplittered beams.

The reflector 221 extends along the circumferential direction of the annular cover 5 in an arc-shaped segment, and is able to be movably adjusted on the annular cover 5 along the radial direction of the annular cover 5 by an external component. In this way, the reflector 221 can be adjustable focused so as to make the finally converged laser beam and the wire be coaxial.

Figure 4:
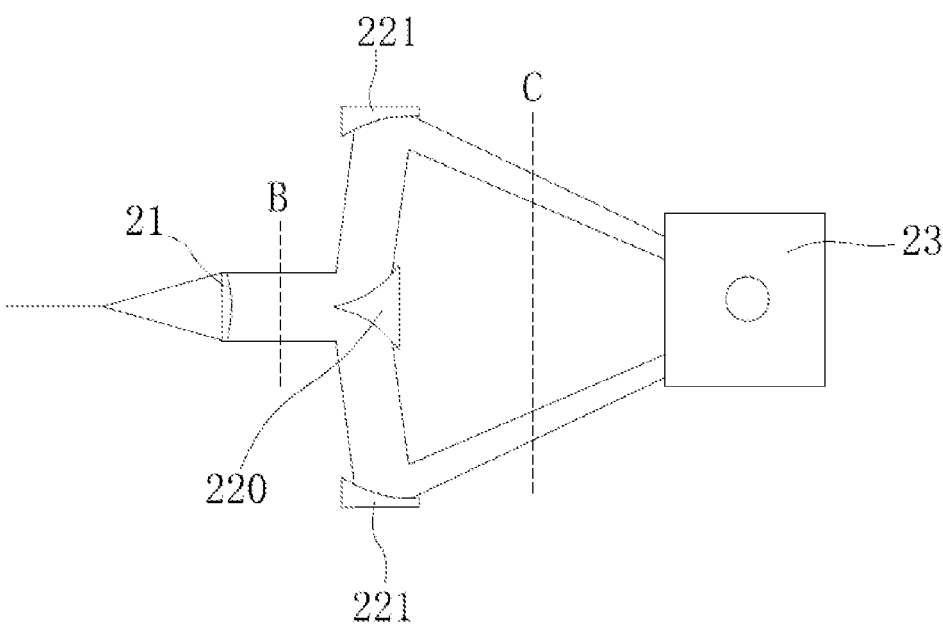
FIG. 4 is a schematic diagram (1) of the laser path of the present disclosure.
Figure 5:
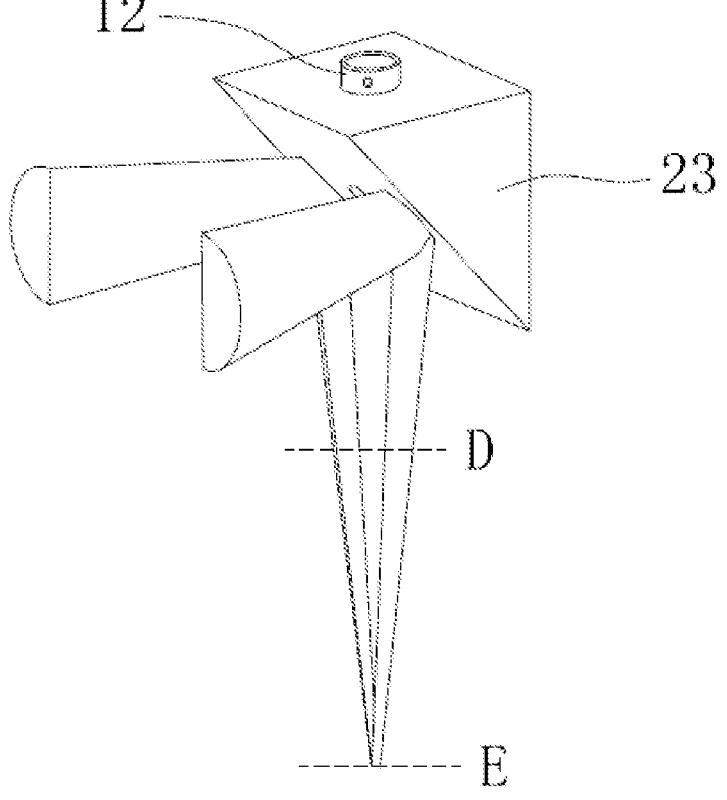
FIG. 5 is a schematic diagram (2) of the laser path of the present disclosure.
Figure 6:
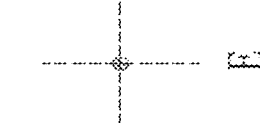
FIG. 6 is a schematic cross-sectional view of the laser path at different positions in FIGS. 4 and 5.
Figure 6:
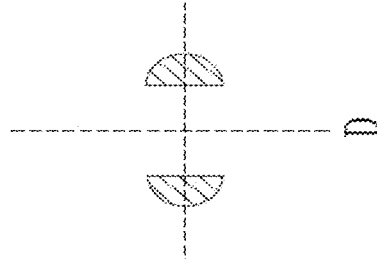
Figure 6:
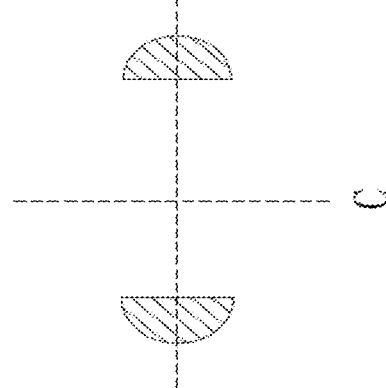
Figure 6:
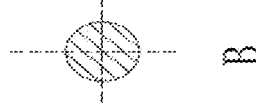

As shown in FIGS. 4 to 6, the mirrors b of the beam splitter 220 are an arc-shaped reflective surface recessed inward from the surface, and an arc-shaped reflective surface is correspondingly provided on the mirror d of the arc-shaped segment reflector 221. The arrangement of the arc-shaped reflective surface can have a good laser-focusing effect, so that the laser energy can be fully used.

The outer diameter of the photomask 3 gradually decreases from the end where the annular seat 4 is located to the end where the laser path turning module 23 is located. The inside-laser wire feeding device further includes a connecting sleeve 6 for connecting the photomask 3 with the laser path turning module 23, where the connecting sleeve 6 is formed with a missing corner 60 that matches the shape of the laser path turning module 23, and the bottom surface of the connecting sleeve 6 is arranged to be a in communication with outside.

In this embodiment, the connecting sleeve 6 and the laser path turning module 23 are connected to each other to form a square body. Moreover, the connecting sleeve 6 and the photomask 3 are integrally formed.

Figure 7:
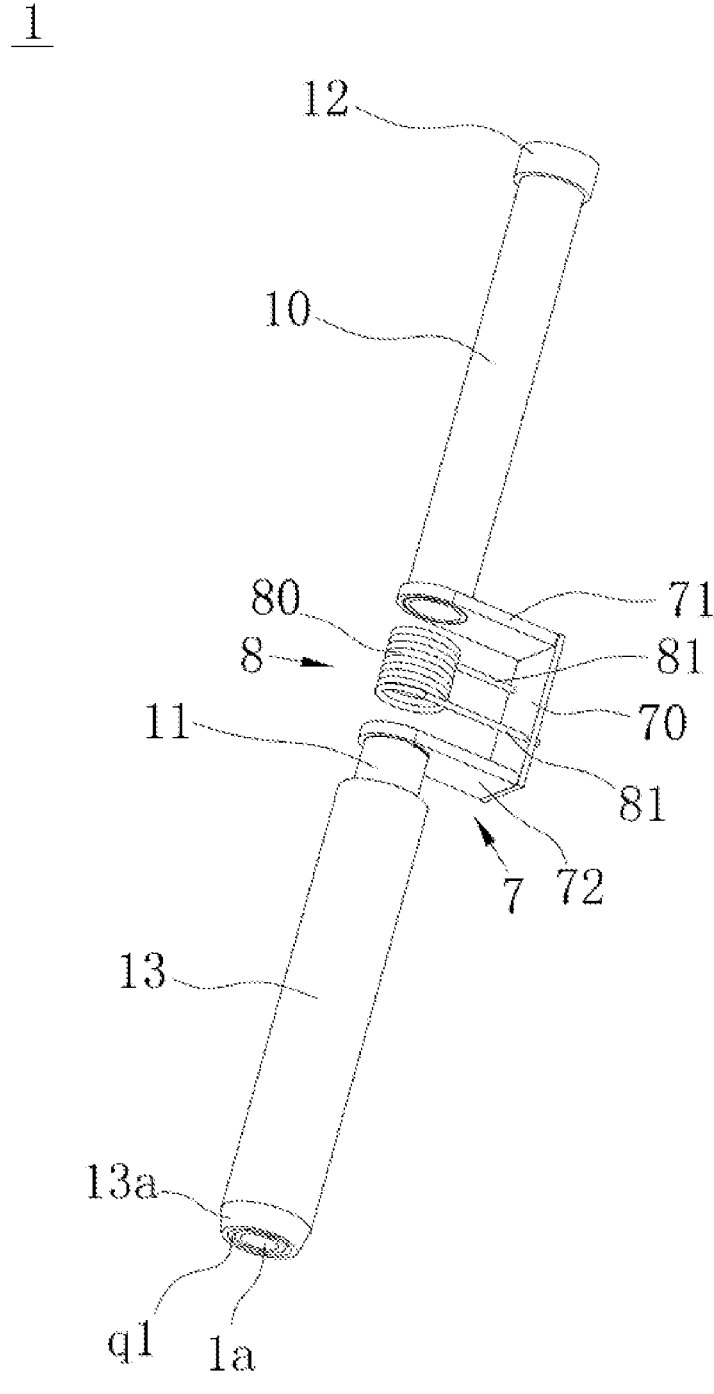
FIG. 7 is the structure schematic diagram of the wire feeding pipeline in FIG. 1.
Figure 8:
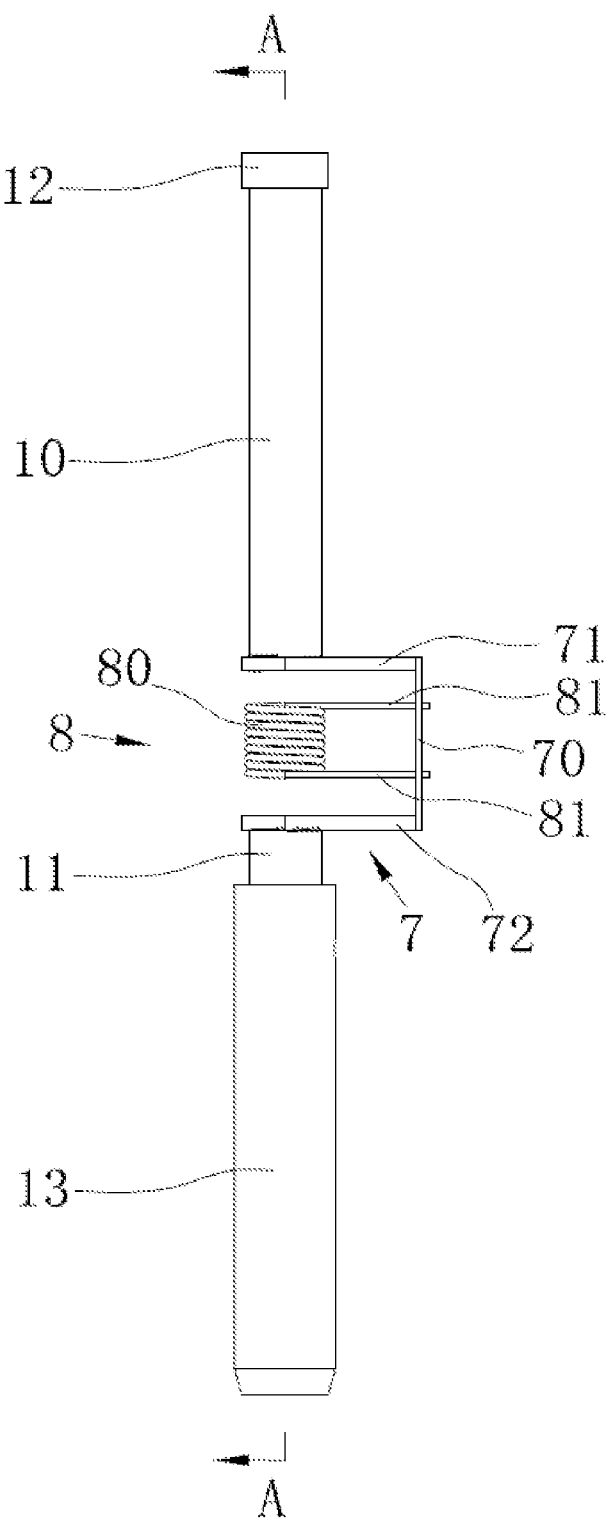
FIG. 8 is a schematic front view of FIG. 7.
Figure 9:
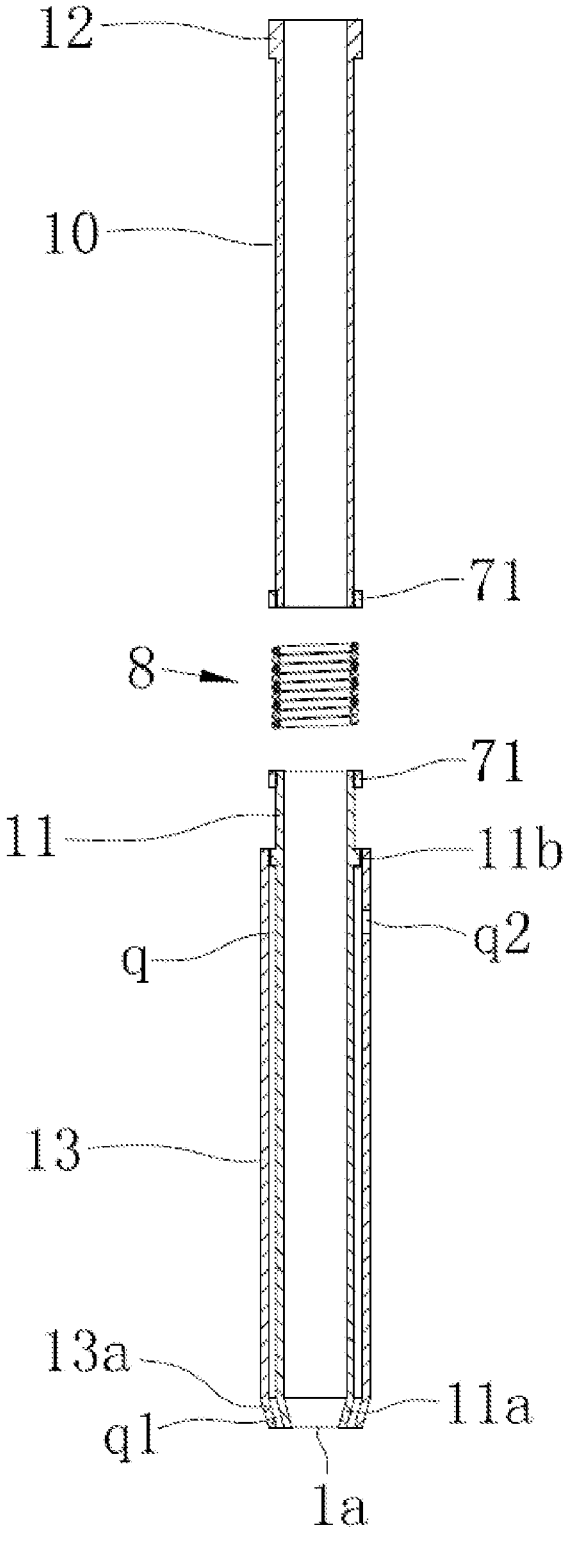
FIG. 9 is a schematic cross-sectional view taken along the line A-A in FIG. 8.

As shown in FIGS. 7 to 9, the wire feeding pipeline 1 includes an upper wire feeding pipe 10 and a lower wire feeding pipe 11, which are discontinuous, and the centerlines of which are overlapped, a gap zone is formed between the upper wire feeding pipe 10 and the lower wire feeding pipe 11. An inner diameter of a lower port of the upper wire feeding pipe 10 is equal to an inner diameter of an upper port of the lower wire feeding pipe 11.

The upper wire feeding pipe 10 passes through the top and bottom surfaces of the laser path turning module 23 from top to bottom, and a pipe cap 12 is provided on the top of the upper wire feeding pipe 10. A pipe sleeve 14 is formed on the laser path turning module 23. The upper wire feeding pipe 10 is fixedly connected to the laser path turning module 23 through the pipe cap 12 and the pipe sleeve 14.

In this embodiment, the inside-laser wire feeding device further includes a connecting piece 7 located on one side of the gap zone and connecting the upper wire feeding pipe 10 and the lower wire feeding pipe 11, an inductive heating coil 8 arranged on the connecting piece 7 and located in the gap zone, and a power supply component connected with the inductive heating coil 8.

The connecting piece 7 includes a connecting panel 70 extending along a height direction of the gap zone, an upper connecting plate 71 connected to the upper wire feeding pipe 10 from an upper part of the connecting panel 70, and a lower connecting plate 72 connected to the lower wire feeding pipe 11 from a lower part of the connecting panel 70.

Threaded holes are respectively formed on the upper connecting plate 71 and the lower connecting plate 72, the upper connecting plate 71 is detachably connected to the lower end of the upper wire feeding pipe 10 through the threaded hole, and the lower connecting plate 72 is detachably connected to the upper end of the lower wire feeding pipe 11 through the threaded hole.

The upper connecting plate 71 and the lower connecting plate 72 have the same structure, and are connected to the same side of the connecting panel 70 facing the gap zone from an end away through the threaded hole.

The inductive heating coil 8 includes a coil body 80 spirally wound along a length direction of the upper wire feeding pipe 10 or the lower wire feeding pipe 11, and a connecting portion 81, which is connected to positive and negative electrodes of the power supply component at a head end and a tail end of the coil body 80, respectively, and a centerline of the coil body 80, a centerline of the upper wire feeding pipe 10, and a centerline of the lower wire feeding pipe 11 are arranged collinearly, and an inner wall of the coil body 80 is able to avoid the beam reflected downward from the reflector mirror.

The inner diameter of the coil body 80 is equal to the inner diameter of the upper port. The interference of the coil body 80 to the beam is avoided.

Further, the inductive heating coil 8 is connected to the connection panel 70 via the connection portion 81, and a soft connection is used between the inductive heating coil 8 and the power supply component, which ensures a convenient and flexible movement.

That is, in this embodiment, by adding an inductive heating coil 8 in the gap zone, when the wire is vertically fed through the inductive heating coil, the inductive power source generates an alternating magnetic field to generate eddy current in the wire to generate heat. According to different wire diameters and wire feeding rates, the inductive coil current and heating time are adjusted to achieve an appropriate preheating value obtained by the wire, and ensure that the wire has a good preheating effect before entering the molten pool.

The space (that is, the heating distance) between the inner wall of the coil body 80 and the wire is controlled to be 1.5 mm to 5 mm, and the corresponding heating distance is configured according to the change of the outer diameter of the wire, so as to achieve an excellent preheating effect of the wire.

The wire feeding pipeline 1 further includes a sleeve pipe 13 arranged on an outer periphery of the lower wire feeding pipe 11, where a shielding gas channel q is formed between the inner wall of the sleeve pipe 13 and an outer wall of the lower wire feeding pipe 11.

A channel outlet q1 of the shielding gas channel q corresponds to the wire outlet 1a of the lower wire feeding pipe, and a channel inlet q2 of the shielding gas channel q is located on one side of the sleeve pipe 13 and is closed to the upper end of the lower wire feeding pipe 11.

The lower end of the lower wire feeding pipe 11 forms a wire outlet port 11a with a diameter gradually decreasing from top to bottom, where an inner wall of the wire outlet port 11a is able to avoid the beam reflected downward from the reflector mirror.

An air outlet port 13a, which is similar to the wire outlet port 11a and is formed in an annular cavity, is provided at the bottom of the sleeve pipe, and a bottom surface of the air outlet port 13a is flush with a bottom surface of the wire outlet port 11a. In that case, under the premise of ensuring that the beam will not interfere, the annular cavity and the conical air outlet port 13a is provided so that the discharged shielding gas can accurately isolate the wire from the outside, thereby ensuring that the wire is hot-melted under the shielding gas.

In an embodiment, an annular connecting lug 11b is formed on the lower wire feeding pipe 11, and the sleeve pipe 13 is threadedly connected with the annular connecting lug 11b at an upper end of the sleeve pipe 13.

To sum up, the implementation process of this embodiment is as follows.

After the beam emitted from the laser enters into the beam channel inside the laser connector 20, the beam is collimated by the collimation module 21 and emitted (the parallel beam formed) horizontally to the right, and is irradiated onto the arc-shaped reflective beam splitter 220 through the beam passage hole 50. The arc-shaped reflective surface of the beam splitter 220 gathers the beams and reflects them toward the corresponding arc-shaped segment reflector 221 in two laser paths, and the arc-shaped reflective surface on the reflector 221 reflects the laser path to the reflector mirror a, and then the two laser paths are reflected downward by the reflector mirror a to form a convergent focus. During this, the wire inside the wire feeding channel is fed vertically downward, and the laser paths are reflected downward from both sides to converge. In that case, there is no interference between the wire and the laser path, and it can also ensure that the beam and the wire are coaxial when entering the molten pool, which can effectively avoid the angle change during the wire feeding process and improve the forming accuracy. Moreover, during the wire feeding process of the wire material, an inductive heating coil 8 is further provided between the upper wire feeding pipe 10 and the lower wire feeding pipe 11. When the wire material is vertically fed through the inductive heating coil, the inductive power supply generates an alternating magnetic field to generate eddy current in the wire to generate heat. According to different wire diameters and wire feeding rates, the inductive coil current and heating time are adjusted to achieve the appropriate preheating value obtained by the wire, so as to ensure that the wire has a good preheating effect before entering the molten pool, thereby greatly improving the wire cladding efficiency and the cladding quality.

Therefore, heating the wire to the required temperature by the inductive heating coil 8 first cannot only alleviate the problem of slow heat absorption of the wire, but also eliminate the problem of stress and deflection during the transmission of the wire, thereby improving the stability of the wire transmission, and saving a certain amount of laser beam energy.

The present application has been described in detail above, but the present application is not limited to the above-mentioned embodiments. All equivalent changes or modifications made according to the spirit of the present application shall be included within the protection scope of the present application.

The invention claimed is:

1. An inside-laser wire feeding device having an inductive auxiliary heating function, comprising:

a laser path unit, wherein the laser path unit comprises a laser connector, a collimation module, a laser splitting module, and a laser path turning module with a reflector mirror, wherein the laser splitting module comprises a beam splitter, and a reflector in a one-to-one correspondence with a mirror of the beam splitter and configured to reflect a beam to the reflector mirror, the reflector mirror is arranged obliquely and is located on a bottom surface of the laser path turning module;

a wire feeding pipeline, passing through an interior of the laser path turning module from top to bottom, wherein a wire outlet of the wire feeding pipeline is located below the reflector mirror, wherein the wire feeding pipeline comprises an upper wire feeding pipe and a lower wire feeding pipe which are discontinuous, and the centerlines of which are overlapped, wherein a gap zone is formed between the upper wire feeding pipe and the lower wire feeding pipe, the inside-laser wire feeding device further comprises a connecting piece located on one side of the gap zone and connecting the upper wire feeding pipe and the lower wire feeding pipe, an inductive heating coil arranged on the connecting piece and located in the gap zone, and a power supply component in communication with the inductive heating coil, wherein the inductive heating coil comprises a coil body spirally wound along a length direction of the upper wire feeding pipe or the lower wire feeding pipe, and a connecting portion that is connected with positive and negative electrodes of the power supply component at a head end and a tail end of the coil body, respectively, wherein a centerline of the coil body, a centerline of the upper wire feeding pipe, and a centerline of the lower wire feeding pipe are arranged collinearly, and an inner wall of the coil body is able to avoid the beam reflected downward from the reflector mirror, wherein the connecting piece comprises a connecting panel extending along a height direction of the gap zone, an upper connecting plate connected to the upper wire feeding pipe from an upper part of the connecting panel, and a lower connecting plate connected to the lower wire feeding pipe from a lower part of the connecting panel, and the inductive heating coil is connected to the connecting panel from the connecting portion of the inductive heating coil.

2. The inside-laser wire feeding device having the inductive auxiliary heating function according to claim 1, wherein threaded holes are formed on the upper connecting plate and the lower connecting plate, respectively, the upper connecting plate is detachably connected to the lower end of the upper wire feeding pipe through the threaded hole, and the lower connecting plate is detachably connected to the upper end of the lower wire feeding pipe through the threaded hole.

3. The inside-laser wire feeding device having the inductive auxiliary heating function according to claim 2, wherein the upper connecting plate and the lower connecting plate have the same structure, and are connected to the same side of the connecting panel facing the gap zone at an end away from the threaded hole.

4. The inside-laser wire feeding device having the inductive auxiliary heating function according to claim 1, wherein an inner diameter of a lower port of the upper wire feeding pipe is equal to an inner diameter of an upper port of the lower wire feeding pipe.

5. The inside-laser wire feeding device having the inductive auxiliary heating function according to claim 4, wherein an inner diameter of the coil body is greater than or equal to the inner diameter of the upper port.

6. The inside-laser wire feeding device having the inductive auxiliary heating function according to claim 1, wherein the wire feeding pipeline further comprises a sleeve pipe arranged on an outer periphery of the lower wire feeding pipe, wherein a shielding gas channel is formed between an inner wall of the sleeve pipe and an outer wall of the lower wire feeding pipe, a channel outlet of the shielding gas channel corresponds to the wire outlet of the lower wire feeding pipe, and a channel inlet of the shielding gas channel is located on one side of the sleeve pipe and is provided close to the upper end of the lower wire feeding pipe.

7. The inside-laser wire feeding device having the inductive auxiliary heating function according to claim 6, wherein the lower end of the lower wire feeding pipe forms a wire outlet port with a diameter gradually decreasing from top to bottom, wherein an inner wall of the wire outlet port is able to avoid the beam reflected downward from the reflector mirror.

8. The inside-laser wire feeding device having the inductive auxiliary heating function according to claim 7, wherein an air outlet port, which is similar to the wire outlet port and forms an annular cavity, is provided at a bottom of the sleeve pipe, and a bottom surface of the air outlet port is flush with a bottom surface of the wire outlet port.

9. The inside-laser wire feeding device having the inductive auxiliary heating function according to claim 7, wherein an annular connecting lug is formed on the lower wire feeding pipe and the sleeve pipe is threadedly connected with the annular connecting lug at an upper end of the sleeve pipe.

* * * * *